United States Patent [19]

Palau

[11] Patent Number: 4,529,569
[45] Date of Patent: Jul. 16, 1985

[54] METHOD OF MANUFACTURING AN EXPANDABLE SPONGY MEMBER

[76] Inventor: Margaret Palau, P.O. Box 880, Brookline, Mass. 02147

[21] Appl. No.: 537,097

[22] Filed: Sep. 29, 1983

[51] Int. Cl.³ ............................................. B29D 27/00
[52] U.S. Cl. ..................... 264/321; 53/121; 53/523; 53/527; 264/136; 446/153; 446/385
[58] Field of Search ............... 264/321, 136; 53/41 R, 53/121, 122, 527, 523; 446/153, 385

[56] References Cited

U.S. PATENT DOCUMENTS

| | | | |
|---|---|---|---|
| 2,659,935 | 11/1953 | Hammon | 264/321 |
| 2,666,954 | 1/1954 | Potter | 264/321 X |
| 2,760,302 | 8/1956 | Cheskin | 446/153 X |
| 2,952,462 | 9/1960 | Planin | 446/153 X |
| 3,000,464 | 9/1961 | Watters | 264/321 X |
| 3,189,669 | 6/1965 | Goldfein | 264/321 X |
| 3,306,966 | 2/1967 | Matejcek et al. | 264/321 |
| 3,321,889 | 5/1967 | Zubik et al. | 53/527 X |
| 3,329,759 | 7/1967 | Rice | 264/321 |
| 3,342,922 | 9/1967 | Karpovich et al. | 264/321 |
| 3,608,056 | 9/1971 | Nelson | 264/321 |
| 3,741,416 | 6/1973 | Bilbow | 53/527 X |
| 4,065,910 | 1/1978 | Eiselt | 53/527 X |
| 4,414,788 | 11/1983 | Berg | 53/527 X |

Primary Examiner—Philip Anderson
Attorney, Agent, or Firm—Herbert L. Bello

[57] ABSTRACT

A method of manufacturing an expandable member comprising the steps of separating a shaped member from a sheet of cellular spongy material, soaking the member in a solution containing a water soluble binder and water, compressing the member into a container and drying the compressed member. The dried member expands to its original shape and size when placed in water.

20 Claims, 4 Drawing Figures

METHOD OF MANUFACTURING AN EXPANDABLE SPONGY MEMBER

BACKGROUND OF THE INVENTION

The present invention relates to methods of manufacturing novelty items and, more particularly, is directed to a method of manufacturing expandable members comprised of a cellular spongy material.

SUMMARY OF THE INVENTION

It is an object of the present invention to provide a method of manufacturing water expandable novelty items comprised of a cellular spongy material.

It is another object of the present invention to provide a method of manufacturing a compressed hydrophilic member which expands when it comes in contact with water. A member of predetermined shape is removed from a sheet of cellular spongy material and placed in a solution containing a soluble binder. After the solution is absorbed, the member is compressed into a container having a volume which is substantially less than the volume of the member. Then, while compressed in the container, the member is partially dried until the binder sets. Finally, the compressed member is removed from the container and allowed to dry completely. When the compressed and dried member is placed in water, it expands to its original size and shape.

Other objects of the present invention will in part be obvious and will in part appear hereinafter.

The invention accordingly comprises the processes together with their steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings wherein.

DETAILED DESCRIPTION OF THE PREFERRED EMBODIMENTS

Figure 1:
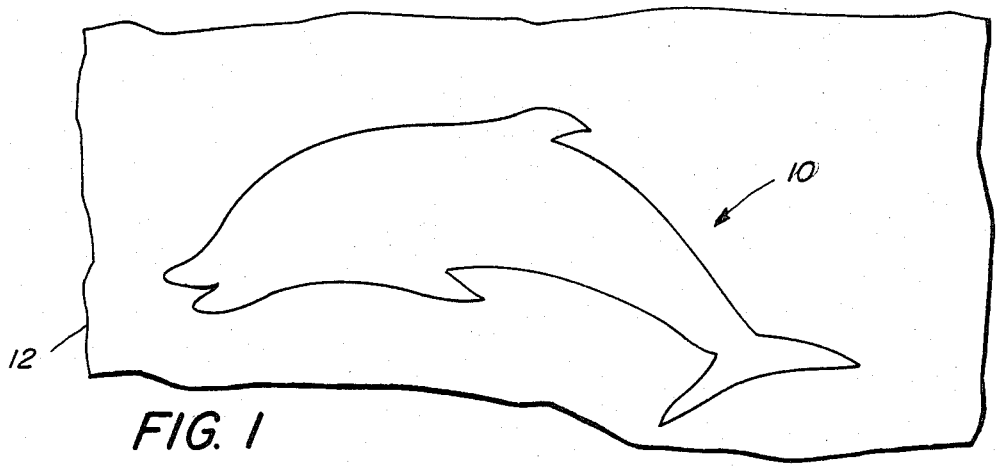
FIG. 1 is a plan view of a shaped form which has been cut from a cellular spongy material.
Figure 2:
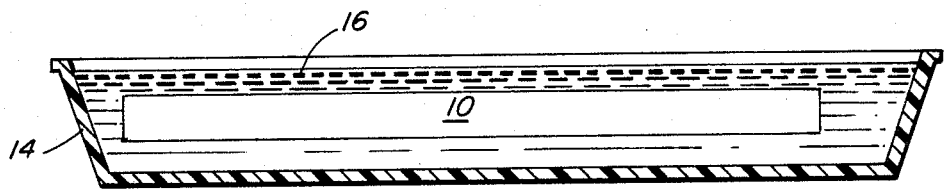
FIG. 2 is a schematic diagram illustrating the soaking step in the process of the invention.

Referring now to the drawings, particularly FIG. 1, there is shown a shaped form 10, for example a dolphin, which has been separated from a sheet of cellular spongy material 12. In the preferred embodiment, dolphin 10 is separated from the sheet material by cutting, for example die cutting process. Cellular spongy material, for example a reticulated polyethylene foam material which is one-half inch thick, has been chosen because of its excellent water absorbing properties. It is to be understood that any open cell material having excellent hydrophilic properties can be used for the shaped forms. Although a dolphin shape has been shown, it is to be understood that a variety of different shapes can be cut from sheet 12. After dolphin 10 has been cut from the sheet 12, it is placed in a vessel 14 containing a solution 16 comprising a soluble binder and water, for example. In the preferred embodiment, the solution is comprised of one part of a water soluble colloidal protein, such as gelatin, and thirty-two parts of water. In an alternative embodiment, a pharmaceutical binder is substituted for the gelatin. In another embodiment, the solution includes one part of a water soluble colloidal protein such as gelatin or a pharmaceutical binder, two parts of sorbic acid and thirty-two parts of water.

Figure 3:
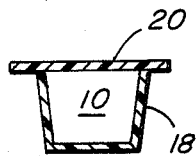
FIG. 3 is a schematic diagram illustrating the compressing step in the process of the invention.

The dolphin figure 10 is allowed to soak in the solution 16 for a sufficiently long time to allow the dolphin figure to absorb the solution. Next, dolphin figure 10 is removed from the solution 16 and squeezed into a container 18, for example a cube shaped container with an open top as shown in FIG. 3. Container 18, for example a blister pack comprised of a clear plastic, has a volume which is at least one-fifth the volume of dolphin figure 10, preferably one-tenth of the volume of the dolphin figure. In the illustrated embodiment, by way of example, each side of cube 18 is one-half inch. The length of the dolphin figure 10 is four inches, the widest part of the body is approximately one inch, and the thickness is one-half inch. Next, the dolphin figure 10 is compressed into container 18 by pushing on a cover plate 20. It is to be noted that the dolphin figure 10 is contained completely within the enclosure formed by container 18 and cover plate 20.

Next, the compressed dolphin figure 10 is partially dried until the soluble binder sets and its cohesive properties hold the dolphin figure in a compressed state. In order to expedite the drying processing, the dolphin figure 10 and container 18 are placed in a heated environment, for example, an oven, or are subjected to a stream of hot air, or pass through a vacuum tunnel. In addition, a dehumidifier is employed in the drying process.

Figure 4:
FIG. 4 is a side view of an expandable member made according to the present invention in its compressed state.

In a preferred embodiment, cover plate 20 is removed and the partially dried dolphin figure 10 is completely dried in container 18. Preferably, container 18 is a clear plastic blister pack or other package which is suitable to be sold to consumers. The completely dried dolphin figure 10 is shown in FIG. 4.

In an alternate embodiment, rather than drying figure 10 in container 18, the compressed and partially dried dolphin figure 10 is removed from the container. Since the soluble binder has set, the dolphin figure 10 retains the shape of the enclosure formed by container 18 and cover 20. Then, the compressed and partially dried dolphin figure 10 is completely dried and remains in the cube form shown in FIG. 4. This final drying step can be accomplished in a variety of apparatuses, for example an oven, a hot air device or a vacuum tunnel.

When the dried and compressed dolphin figure 10 is placed in warm water, the cohesive properties of the soluble binder are released and the dolphin figure returns to its original shape and size shown in FIG. 1.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A method of manufacturing an expandable member of predetermined shape comprising the steps of:
   (a) separating a member of predetermined shape from a sheet of liquid absorbing material;

(b) soaking the member in a solution containing a soluble binder;

(c) removing the member from the solution;

(d) compressing the member into a consumer saleable closed container with an open end, the container having a volume which is less than one-fifth the volume of the member;

(e) drying the compressed member in the container; and (f) covering the open end of the container.

2. The method as claimed in claim 1 wherein the material is a reticulated polyethylene foam.

3. The method as claimed in claim 2 wherein the separating step includes the step of cutting the member form the sheet of material.

4. The method as claimed in claim 2 wherein the separating step includes the step of die cutting the member from the sheet of material.

5. The method as claimed in claim 2 wherein the solution comprises a solution having one part water soluble colloidal protein and thirty-two parts water.

6. The method as claimed in claim 5 wherein the solution includes two parts sorbic acid.

7. The method as claimed in claim 2 wherein the water soluble colloidal protein is gelatin.

8. The method as claimed in claim 1 wherein the compressing step includes the step of covering the member with a plate and compressing the member in the container by urging the plate against the member.

9. The method as claimed in claim 1 wherein the drying step includes the step of partially drying the member to set the binder while the member is in the covered container.

10. The method as claimed in claim 9 wherein the drying step includes the step of removing the plate and completely drying the member while it is in the container.

11. The method as claimed in claim 9 wherein the drying step includes the step of uncovering the plate and removing the partially dried member from the container and completely drying the member.

12. A method of manufacturing a shaped member which expands when placed in water comprising the steps of:

(a) separating a member of predetermined shape from a sheet of water absorbing material;

(b) soaking the member in a solution containing a water soluble binder and water;

(c) removing the member from the solution;

(d) compressing the member into a consumer saleable package having a closed container with an open end, the container having a volume which is less than one-fifth the volume of the member;

(e) drying the compressed member in the container; and (f) covering the open end of the container.

13. The method as claimed in claim 12 wherein the water absorbing material is reticulated foam.

14. The method as claimed in claim 13 wherein the reticulated foam is an open cell polyethylene foam.

15. The method as claimed in claim 14 including the step of completely drying the compressed member while it is in the container.

16. The method as claimed in claim 14 wherein the step of drying the compressed member includes the step of partially drying the compressed member while it is in the container.

17. The method as claimed in claim 16 including the step of removing the partially dried compressed member from the container.

18. The method as claimed in claim 17 including the step of completely drying the compressed member after it has been removed from the container.

19. The method as claimed in claim 13 wherein the compressing step includes the step of covering the member with a plate and compressing the member in the container by urging the plate against the member, the container has a volume which is one-tenth the volume of the member before it is compressed, and said drying step includes the step of partially drying the member to set the binder while the member is under compression.

20. The method as claimed in claim 19 wherein the drying step includes the step of removing the plate and completely drying the member while it is in the container and then covering the open end of the container to form a closed consumer saleable package.

* * * * *